(12) United States Patent
Popovic et al.

(10) Patent No.: US 8,755,349 B2
(45) Date of Patent: *Jun. 17, 2014

(54) GENERATING AND ALLOCATING TIME-FREQUENCY MAPPING PATTERN IN A COMMUNICATION SYSTEM

(75) Inventors: Branislav M. Popovic, Stockholm (SE); Jaap Van De Beek, Täby (SE)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,753

(22) Filed: Feb. 23, 2012

(65) Prior Publication Data

US 2012/0147848 A1   Jun. 14, 2012

Related U.S. Application Data

(63) Continuation of application No. 11/653,114, filed on Jan. 11, 2007, now Pat. No. 8,149,780, which is a continuation of application No. PCT/CN2004/000128, filed on Feb. 17, 2004.

(51) Int. Cl.
| | |
|---|---|
| *H04J 11/00* | (2006.01) |
| *H04W 4/00* | (2009.01) |
| *H04J 4/00* | (2006.01) |
| *H04J 1/00* | (2006.01) |

(52) U.S. Cl.
USPC ............ 370/330; 370/208; 370/478; 370/480

(58) Field of Classification Search
USPC ......... 370/203, 204, 206, 208–211, 312, 330, 370/343–345, 347, 478, 480–481, 498; 375/260, 269, 273–275, 279
See application file for complete search history.

(56) References Cited

U.S. PATENT DOCUMENTS

| | | |
|---|---|---|
| 6,175,550 B1 | 1/2001 | Van Nee |
| 6,456,669 B1 | 9/2002 | Sakoda |
| 6,490,262 B1 | 12/2002 | Hogger |
| 6,549,784 B1 | 4/2003 | Kostic et al. |
| 6,587,498 B1 | 7/2003 | Sarkola |
| 6,674,732 B1 | 1/2004 | Boehnke et al. |
| 6,985,531 B2 | 1/2006 | McCarty |
| 2002/0018450 A1 | 2/2002 | McKenna et al. |

(Continued)

FOREIGN PATENT DOCUMENTS

| | | |
|---|---|---|
| WO | 03/001696 | 1/2003 |
| WO | 2004/073219 | 8/2004 |

OTHER PUBLICATIONS

3GPP TSG RAN WG1#30, Diversity Gains for some Time-Freuquency Mapping Alternatives for OFDM, Jan. 2003.*

(Continued)

*Primary Examiner* — Redentor Pasia
(74) *Attorney, Agent, or Firm* — Brinks, Gilson & Lione

(57) ABSTRACT

A method is provided for generating and allocating time-frequency mapping pattern (TFP) in a communication system. A set of orthogonal TFPs is generated from a TFP. And a TFP from the set of orthogonal TFPs is allocated to a user equipment in a transmission time interval, TTI, within a cell of the communication system. Also provided are a transmitter, a base station, and a user equipment.

24 Claims, 4 Drawing Sheets

(56) References Cited

U.S. PATENT DOCUMENTS

| | | | |
|---|---|---|---|
| 2002/0085641 A1 | 7/2002 | Baum | |
| 2003/0072254 A1* | 4/2003 | Ma et al. | 370/208 |
| 2003/0095533 A1 | 5/2003 | Joo et al. | |
| 2003/0099280 A1 | 5/2003 | Kumar et al. | |
| 2004/0001429 A1 | 1/2004 | Ma et al. | |
| 2004/0005016 A1 | 1/2004 | Tewfik et al. | |
| 2004/0022183 A1 | 2/2004 | Li et al. | |
| 2004/0062193 A1 | 4/2004 | Ma et al. | |
| 2004/0161018 A1* | 8/2004 | Maric | 375/136 |
| 2005/0047325 A1 | 3/2005 | Singh et al. | |

OTHER PUBLICATIONS

Golomb et al. Construction and Properties of Costas Arrays, 1984.*

Golomb et al. "Construction for Costas Arrays" 1992.*

Office Action issued in corresponding European Patent Application No. 04711554,8, mailed Apr. 4, 2010.

Golomb, Solomon; The T4 and G4 Constructions for Costas Array. IEEE Transactions on Information Theory, 38(4):1404-1406, Jul. 1992.

Saberina et al. Multi-User UWB-OFDM Communications. Communications, Computers, and Signal Processing, 2003. PACRIM. 2003 IEEE Conference, Aug. 28-30, 2003, vol. 1 pp. 127-130.

Communication from European Patent Office issued in corresponding European Patent Application No. 04711554.8, mailed Apr. 7, 2010.

Huawei "Text Proposal for Section 6.2.4 in TR25.892 on OFDM User Multiplexing" 3GPP TSG RAN WG1 #32 R1-30800, Aug. 25-29, 2003.

S.W. Golmb and L.R. Welch. "Perfect Codes in the Lee Metric and the Packing of Polynomioes". Siam J. Appl. Math, vol. 18 No. 2 pp. 122-137. Jan. 1970.

"$3^{rd}$ Generation Partnership Project: Technical Specification Group Radio Access Network; Feasibility Study for OFDM for UTRAN Enhancement (Release 6)" 3GPP Draft; R1-031436TR25892V0.5.2 $3^{rd}$ Generation Partnership Project Technical (3GPP), Mobile Competence Center, 650, Dec. 2003.

Huawei "Revised Text Proposal for OFDM User Traffic Multiplexing Solutions" 3GPP Draft R1-030970, $3^{rd}$ Generation Partnership (3GPP), Mobile Competence Centre; 650, Oct. 2, 2003.

Huawei "Updated Text Proposal for OFDM Units for Full Frequency Reuse Without Resource Planning" 3GPP Draft TSG RAN WG1 #35, R1-031172, Nov. 17-21, 2003.

Huawei "Time-Frequency Mappings of OFDM Units for Full Frequency Reuse without Resouce Planning" 3GPP Draft TSG Ran WG1 #33, R1-030799, Aug. 25-29, 2003.

Golmb W. et al, "The T4 and G4 Constructions for Costas Array", IEEE Transactions on Information Theory vol. 38. No. 4 Jul. 1992.

Albdawiw and Bose et al. "Quasi-Perfect Lee Distance Codes." IEEE Transactions on Information Theory. vol. 49. No. 6 pp. 1535-1539, Jun. 2003.

Nortel Networks, "OFDM Unit Multiplexing," 3GPP TSG-RAN—1 Meeting #32, R1-030522, May 19-23, 2003.

Moreno Oscar and Meric et al "A New Family of Frequency-Hop Codes," IEEE Transactions on Communications, vol. 4. No. 8, pp. 1241-1244, Aug. 2000.

* cited by examiner ically the structure of the communi-
GENERATING AND ALLOCATING TIME-FREQUENCY MAPPING PATTERN IN A COMMUNICATION SYSTEM

CROSS-REFERENCE TO RELATED APPLICATIONS

This application is a continuation application of U.S. patent application Ser. No. 11/653,114, filed on Jan. 11, 2007, which is a continuation of International Application PCT/CN2004/000128, filed on Feb. 17, 2004. The afore-mentioned patent applications are hereby incorporated by reference in their entireties.

FIELD

The present disclosure is related to the field of radio communications, and in particular to radio communication systems employing time-frequency mapping pattern.

RELATED TECHNOLOGY

In a communication system including several users sharing the transmission medium, i.e. the available communication resources, attention is given to the co-existence of the different signals being present within the communication system. The users of the communication system generally share the same pool of communication resources. When allocating the communication resources, e.g. different channels, to multiple users, it is realised that the signal of one user may affect or interfere with the signal of another user. A communications system designer thus has to design a user traffic multiplexing scheme bearing this in mind, and thus design the multiplexing scheme so as to handle this undesired interference.

In communication systems in which a geographical division is used, i.e. a cellular system, there are mainly two kinds of multi-user interference present. Firstly, the interference from users within the same geographical area, e.g. a cell, the so called intra-cell interference, and secondly the interference from users in adjacent or neighbouring cells, the so called inter-cell interference. The inter-cell interference may be decreased for example by means of resource planning, e.g. frequency planning, so that a specific communication resource is reused in such a way that interference is minimised. For frequency planning the inter-cell interference may be minimised by using a frequency reuse scheme, in which a certain frequency is not used in neighbouring cells. However, resource planning, for example frequency planning and coordination between cells, is time consuming, expensive and in some cases not even feasible.

Besides resource planning, whereby inter-cell interference may be decreased, there are other ways to decrease interference. One way to decrease both intra-cell interference and inter-cell interference is to utilise frequency hopping. Frequency hopping consists in changing the frequency used by a channel at regular intervals. Thus, cells using the same frequencies but different, presumably de-correlated, hopping sequences lead to decreased interference.

WO2003/001696 describes a method for decreasing inter-cell interference. Frequencies are allocated to cells in a communication system according to functions selected to minimise repeated collisions between hopping sequences used by the base stations of neighbouring cells. This is thus an example of a prior art method for decreasing inter-cell interference in a communication system, and in which system also resource planning is performed.

SUMMARY

In one aspect, an embodiment of the present disclosure provides a method of generating and allocating time-frequency mapping pattern (TFP) in a communication system. The method comprises: generating a TFP, generating a set of orthogonal TFPs from said TFP; and allocating a TFP from the set of orthogonal TFPs to a user equipment in a transmission time interval (TTI) within a cell of the communication system.

In accordance with one embodiment of the present disclosure the generic time-frequency pattern is a generic Costas sequence. Such Costas sequence based time-frequency patterns have desirable properties with respect to interference and diversity, providing high diversity gain while at the same time minimising inter-cell and avoiding intra-cell interference. Further, all T-F patterns in the set are obtained from a first pattern giving an easily implemented and easily administrated way to obtain orthogonal T-F mapping patterns.

In accordance with one embodiment of the present disclosure said Costas sequence is obtained by a T4 construction. This choice of Costas sequence provides improved diversity gain compared to the other choices of Costas sequences. In accordance with one embodiment of the present disclosure a random cyclic offset is changed for each transmission time interval (TTI), according to a cell-specific pseudo-random sequence. Consequently, the different cells within the communication system will use in principle different cyclically shifted versions of the same set of time-frequency mapping patterns. The unique cross-correlation properties of the set of time-frequency mapping patterns ensure limited cross-interference between any two cells at any time. This random offsetting in each TTI also makes instantaneous interference to appear noise-like.

In accordance with another embodiment of the present disclosure said set of orthogonal T-F mapping patterns is generated by cyclic shifts in the frequency domain of said generic time-frequency (T-F) mapping pattern (TFPgeneric). Thereby a set of orthogonal T-F mapping patterns is obtained in an easy and convenient fashion, and further ensures that the set of patterns is orthogonal. A random variable cyclic offsetting could then be performed in the time domain, giving maximum cross-correlations not significantly higher than the ideal values guaranteed for Costas sequences by definition.

In an alternative embodiment said set of orthogonal T-F mapping patterns is generated by cyclic shifts in the time domain, and a random variable cyclic offsetting could then be performed in the frequency domain. Thereby a very flexible solution for multiplexing is provided, giving a network designer alternative ways to implement the present disclosure.

In accordance with another embodiment of the present disclosure the orthogonal T-F mapping patterns are randomly allocated to multiple users and/or traffic channels in each TTI. This feature decreases the probability of collisions between signals from the different cells.

In accordance with another embodiment of the present disclosure, a transmitter, a base station, a user equipment for performing said method is provided, and such a system, both yielding corresponding advantages.

DETAILED DESCRIPTION OF EMBODIMENTS

A brief description of an OFDM (Orthogonal Frequency Division Multiplexing) system is provided. However, an OFDM system is only an example of a time-frequency divided system in which the present disclosure may be implemented, and it is understood that the disclosure may be implemented in other time-frequency divided systems as well.

OFDM is a transmission technique that allows high data rates to be transmitted over very noisy channels, yet at a comparatively low complexity, and is used for digital audio broadcasting (DAB) and digital video broadcasting (DVB). OFDM has several favourable properties like high spectral efficiency and robustness to channel dispersion, for which reasons it will most likely be used for future broadband applications such as digital mobile radio communication.

In an OFDM system the data to be transmitted is spread over a large number of carriers, and the data rate to be transferred by each of these carriers is consequently reduced in proportion to the number of carriers. The carriers have an equal, precisely chosen frequency spacing, and the frequency bands of the sub-carriers are not separate but overlap. By using an IFFT (Inverse Fast Fourier Transform) as modulation, the spacing of the sub-carriers is chosen in such a way that at the frequency, where a received signal is evaluated, all other signals are zero. The choice of carrier spacing is made so that orthogonality is preserved, giving the method its name.

OFDM systems transmit constellation symbols block-wise. A block of constellation symbols is transmitted during one OFDM symbol interval. During a subsequent OFDM symbol interval, a new block of constellation symbols is transmitted and so on. Thus, any transmitted constellation symbol in an OFDM system can be characterised by two indexes: the first index indicating during which OFDM symbol interval it is transmitted, and the second index indicating which of the sub-channels it is transmitted on.

Figure 1:
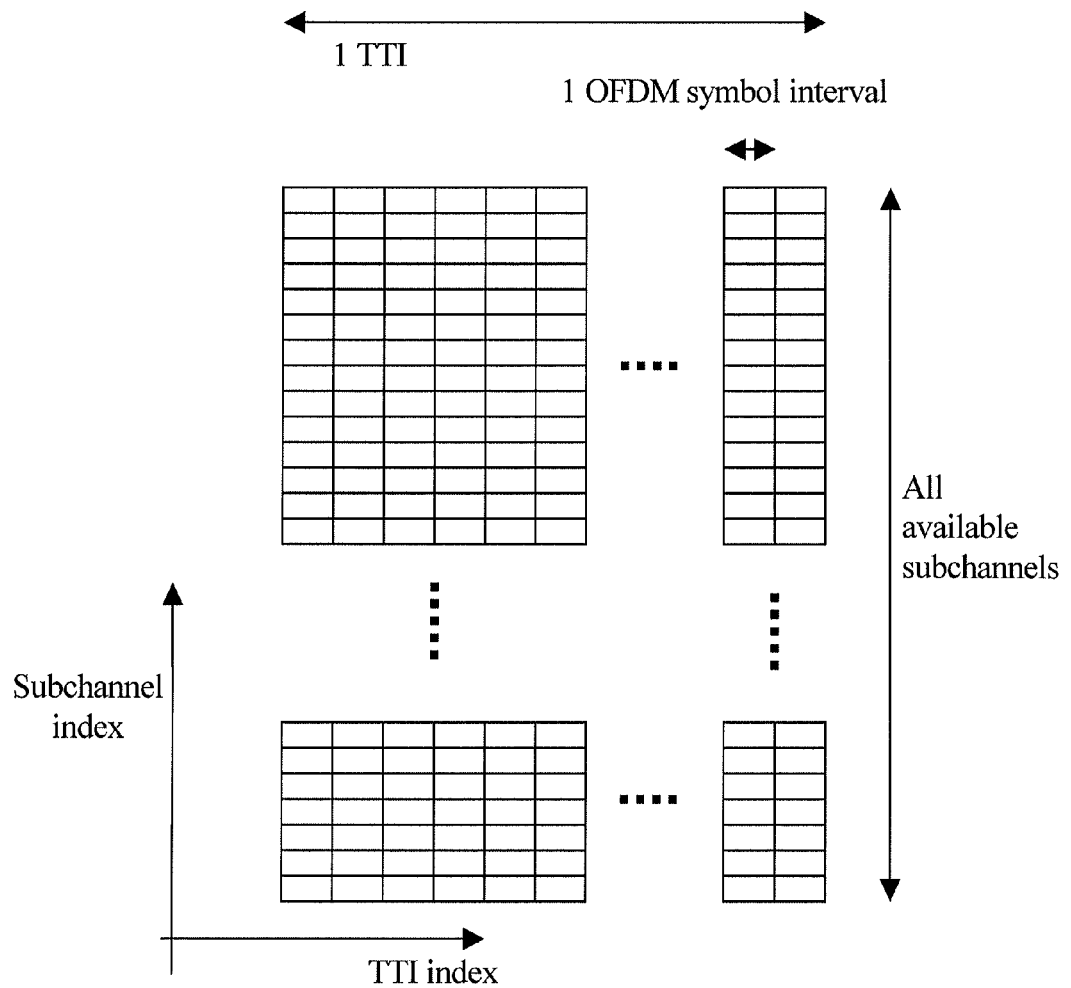
FIG. 1 shows schematically the structure of the communication resources in a time-frequency divided communication system.

With reference to FIG. 1, a time-frequency resource grid is shown, where TTI (Transmission Time Interval) indices are shown on the x-axis, and sub-channel indices on the y-axis. In the illustrative communication system used to explain an embodiment of the present disclosure, data is transmitted in packets and each packet is transmitted during a transmission time interval, TTI. A TTI consists of a fixed finite number of OFDM symbol intervals. Each cell in the figure can carry a constellation symbol and is characterized by the two indexes mentioned above: the first index indicating during which particular OFDM symbol interval in a particular TTI it is transmitted and the second index indicating which particular sub-carrier frequency (sub-channel index) is used for its transmission.

User traffic multiplexing is the allocation of transmitter resources (such as time, frequency, antennas, etc.) to the different traffic channels within the same cell, so that the resulting physical channels can co-exist preferably without mutual interference, or with as little interference as possible. Particularly, in an embodiment, it is assumed that the communication resources to be allocated are time and frequency divided resources, divided into time slots (TS) and frequency sub-bands, respectively, where each sub-band contains a number of subcarriers. Then the user traffic multiplexing can be defined as the allocation of a particular sequence of sub-bands for the transmission of each traffic channel during a TTI.

A time-frequency mapping pattern (TFP) is a sequence of indices of the sub-bands used for transmission within a TTI. The time-frequency mapping patterns thus specify the different physical channels or traffic channels, one T-F mapping pattern for each physical channel or each traffic channel.

An OFDM unit is a group of constellation symbols transmitted in a sub-band during a time slot (OFDM symbol interval). Thus a TFP is used to map a number of OFDM units onto the time-frequency grid within a TTI. In practice, certain sub-carriers will be reserved for pilots and signalling, which may lead to variation in OFDM unit size and to mapping of certain OFDM units onto non-contiguous sub-carriers.

In accordance with an embodiment of the disclosure, all the cells of a cellular communication system employ the same, special set of T-F mapping patterns for multiplexing the traffic. Thus no network resource planning is needed, and consequently no network capacity needs to be reserved for such planning. Thus, given the fact that other neighbouring cells employ the same resource grid (users in neighbouring cells thus run the risk of transmitting data on the same sub-carriers and during the same OFDM symbol intervals), the problem is now to assign the communication resources in each cell to the users in such a way that 1. The interference within cells is minimised (intra-cell interference),
2. The interference form other cells is minimised (inter-cell interference), and
3. The diversity-performance for each user is maximised.

For a given user, the inter-cell interference appears in the form of "hits" or "collisions" (i.e. occurrences of data in other cells transmitted at the same frequencies and during the same OFDM symbol interval), either from an identical TFP used in another cell or from another TFP used in another cell.

In order to obtain a maximised diversity gain, the design of TFP should be such that every pair of OFDM units is separated in time and frequency as much as possible. This qualitative description can be mathematically formulated as the requirement to maximise the minimum Lee distance between the elements of a TFP. The Lee distance between the two points is the sum of the absolute values of the differences of the corresponding coordinates.

In accordance with an embodiment of the present disclosure, the generic T-F mapping pattern TFPgeneric, might be obtained from a Costas sequence. Briefly, a Costas sequence is a mathematical sequence having certain particularly beneficial correlation characteristics. By definition, the number of hits between a Costas sequence and its arbitrary (non-cyclic) time and frequency-shifted version is equal to 0 or 1. For further information on Costas sequences, see for example S. W. Golomb and H. Taylor, "Construction and properties of Costas arrays", Proc. IEEE, vol. 72, pp 1143-1163, September 1984.

The inventors of the present disclosure have realised the beneficial properties of Costas sequences for application to a multiplexing scheme in an OFDM system. When basing the TFPs used in a communication system on the Costas sequence, all the above mentioned aspects of resource allocation is optimised concurrently. That is, the inter-cell interference is minimised, the intra-cell interference is avoided, the diversity performance for each user is maximised and no network planning is needed. There are mathematical functions that may render an even better diversity performance, but then the interference performance would suffer.

In accordance with an embodiment of the disclosure, a orthogonal set of TFPs is obtained from a generic Costas sequence. This may be accomplished either by using the original-size Costas sequence or by adjusting it to the size of the T-F grid, as will be explained more in detail below by means of some specific examples. The adjustment may consist of a periodic extension of the generic Costas sequence or of shortening the generic Costas sequence.

In accordance with an embodiment of the disclosure, an orthogonal set of TFPs is obtained by cyclic shifts in the frequency domain of the generic TFP, and thereby there will be no interference within a cell. In an alternative embodiment the orthogonal set of TFPs is obtained by cyclic shifts in the time domain of the generic TFP. This design ensures that the set of TFPs is orthogonal, i.e. no hits (or collisions) will occur between the different patterns. Further, all the available time-frequency resources are utilised, meaning that all time slots (i.e. OFDM symbol intervals) and all sub-bands are used if all patterns are deployed.

High diversity gain of each TFP is achieved, since the generic Costas sequence possesses good Lee distance properties. The diversity gain of all TFPs can be further maximised by choosing a specially constructed Costas sequence, having an improved minimum Lee distance.

Figure 2:
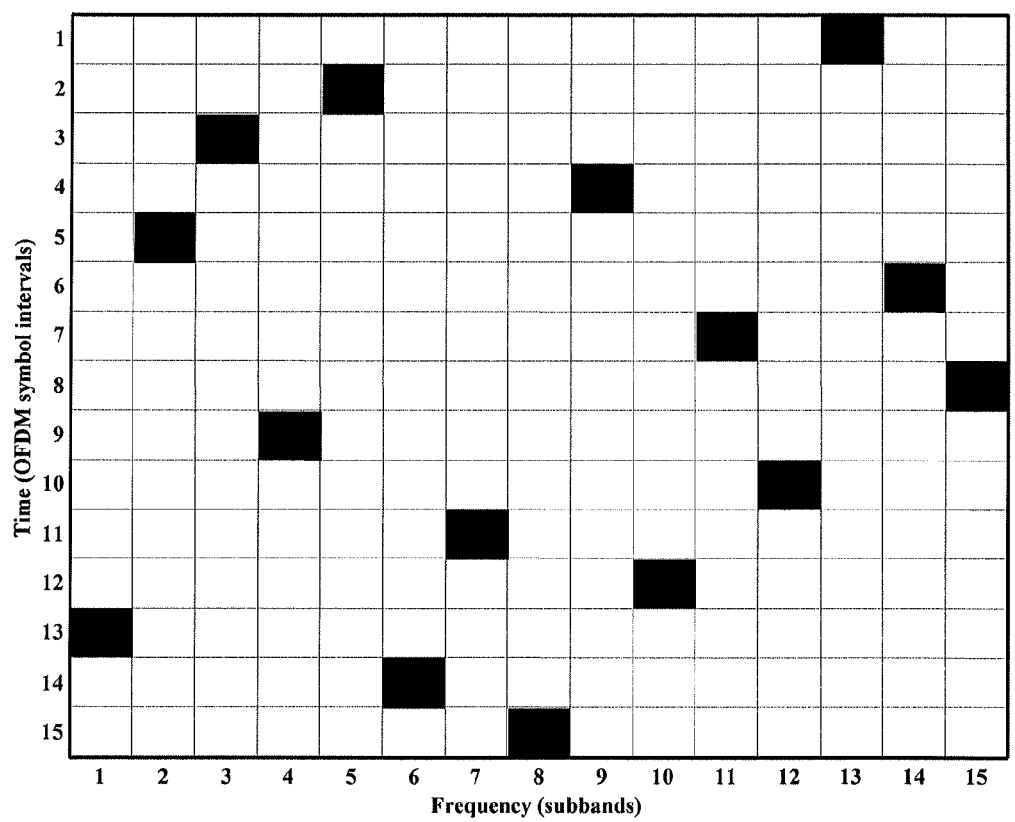
FIG. 2 shows an exemplary time-frequency mapping pattern.

With reference now to FIG. 2, starting with the shown exemplary T-F mapping pattern, 14 cyclic shifts in the frequency domain may be performed, giving a total of 15 TFPs. This set of TFPs is an orthogonal set and is allocated to a single cell. All these TFPs are then cyclically time-shifted by a cell specific offset, corresponding to an integer number of OFDM symbols. That is, a time slot index (e.g. an integer in the interval 1-15) may be randomly assigned to a cell. This cell specific time offset is changed for each TTI in accordance with a cell-specific pseudo-random sequence. In that way the different cells, even though being synchronous in one specific TTI, which causes interference, they will most likely be asynchronous in the next TTI. The cross-interference is thus minimised, as predicted by the correlation properties of the TFPs. Stated another way, the inter-cell interference is randomised in time, from one transmission time interval to another, by the random cyclic time-shifts of the whole set of orthogonal codes.

In an alternative embodiment, the 14 cyclic shifts are not performed in the frequency domain, but in the time domain, again giving a total of 15 TFPs. This set of TFPs is also an orthogonal set and is allocated to a single cell. All these TFPs are then cyclically frequency-shifted (instead of time-shifted) by a cell specific offset, corresponding to an integer number of OFDM symbols. That is, a frequency sub-band index (for example an integer in the interval 1-15) may be randomly assigned to a cell. This cell specific offsetting is again changed for each TTI in accordance with a cell-specific pseudo-random sequence. As in the embodiment above, the different cells, even though being synchronous in one specific TTI (thus causing interference), they will most likely be asynchronous in the next TTI, and the cross-interference is thus minimised.

The different sequences of offsets, both in time or in frequency, can for example be generated as time-shifted versions of a single pseudo-random sequence.

In accordance with an embodiment of the present disclosure, one TFP or more TFPs may be allocated to a single user, for example in dependence on the amount of traffic data for the transmission, or in dependence on available communication resources or on the priority of a specific user. However, within each cell, no TFP is assigned to more than one user during the same TTI, and thereby any potential intra-cell interference is eliminated.

In accordance with an embodiment of the present disclosure, random allocation of the orthogonal TFPs to a plurality of users and/or traffic channels in each TTI, decreases the probability of collisions between the signals from the different cells. It is however contemplated that the allocation may be performed in a pseudo-random or even non-random way, i.e. in a fixed way.

In spite of the design of the generic TFP as a Costas sequence and in spite of the fact that the sets of TFPs in neighbouring cells are subject to a random cyclic time-shift, occasionally the exact same TFP may appear in two neighbouring cells at the same time. In particular, when random allocation of the orthogonal TFPs to a plurality of users and/or traffic channels in each TTI is performed, the properties of the Costas sequences are best exploited and the probability that all OFDM units collide is reduces significantly, compared to other fixed allocation strategies.

As the set of TFPs in some TTI is obtained by cyclically shifting the generic TFP in the frequency or time domain, the property definition mentioned earlier (i.e. number of hits between a Costas sequence and its arbitrary (non-cyclically) time and frequency-shifted version equals 0 or 1) is not applicable exactly and the number of hits may be higher. However, it is reasonable to expect, and can in fact be proven by examples, that the actual maximum cross-correlations are not significantly higher than the ideal values.

An embodiment of the disclosure is described below by means of specific examples of the allocation in accordance with the inventive method.

EXAMPLES

Again with reference to FIG. 2, the set of 15 orthogonal TFPs, one for each OFDM physical channel or traffic channel, is derived from a single Costas sequence of length 15 obtained from the so-called T4 construction. This generic TFP, TFPgeneric, is shown in FIG. 2, as a sequence of indices of the frequency sub-bands used for transmission within one TTI.

Case (A): For a T-F grid with 12 OFDM symbol intervals (time slots) and 15 frequency sub-bands, the first pattern is obtained by discarding the last three symbols of the generic Costas sequence, in order to obtain the patterns of length NOFDM=12.

Case (B): For a T-F grid with 27 OFDM symbol intervals (time slots) and 15 frequency sub-bands, the first pattern is obtained by extending the generic Costas sequence by the reversed first 12 symbols of the same generic pattern, in order to obtain the patterns of length NOFDM=27.

Mathematically these two cases may be expressed as $TFP0(A) = TFPgeneric(1:12)$ $TFP0(B) = [TFPgeneric\ TFPgeneric(12:-1:1)]$ where (a:b) denotes the sequence of integers (a, a+1, a+2, ..., b−1, b), (b:−1:a) denotes the sequence of integers (b, b−1, b−2, ..., a+1, a), and [A B] denotes the straightforward concatenation of 2 sequences.

For the first case, case (A), the first two T-F mapping patterns are given by:

$TFP0(A) = [13\ 5\ 3\ 9\ 2\ 14\ 11\ 15\ 4\ 12\ 7\ 10]$ $TFP1(A) = [14\ 6\ 4\ 10\ 3\ 15\ 12\ 1\ 5\ 13\ 8\ 11]$ where TFP0(A) maybe regarded as a generic TFP. TFP1(A) is obtained by cyclic shift of TFP0(A).

For the second case, case (B), the first two T-F mapping patterns are given by:

$$TFP0(B)=[13\ 5\ 3\ 9\ 2\ 14\ 11\ 15\ 4\ 12\ 7\ 10\ 1\ 6\ 8\ 10\ 7\ 12\ 4\ 15\ 11\ 14\ 2\ 9\ 3\ 5\ 13]$$

$$TFP1(B)=[14\ 6\ 4\ 10\ 3\ 15\ 12\ 1\ 5\ 13\ 8\ 11\ 2\ 7\ 9\ 11\ 8\ 13\ 5\ 16\ 12\ 15\ 3\ 10\ 4\ 6\ 14]$$

where TFP0(B) maybe regarded as a generic TFP. TFP1(B) is obtained by cyclic shift of TFP0(B).

Figure 3:
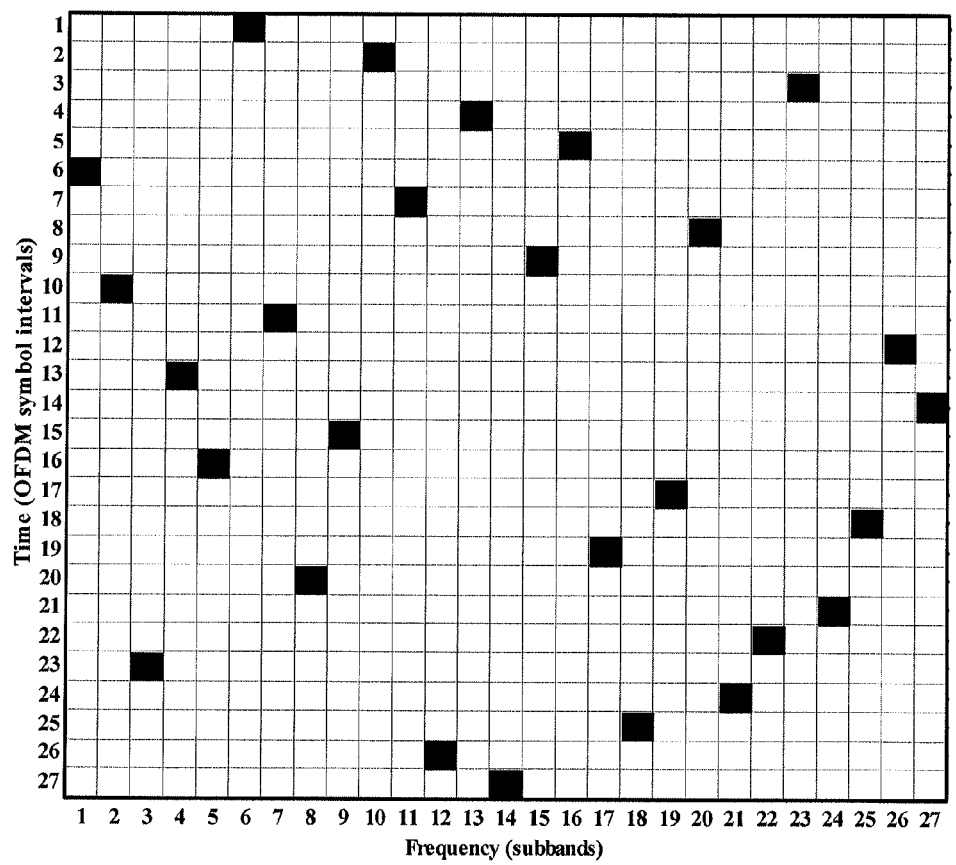
FIG. 3 shows another exemplary time-frequency mapping pattern.

With reference to FIG. 3, another generic Costas sequence, with minimum Lee distance equal to 3, is shown. In particular, the Costas sequence shown is a T4 Costas sequence of length 27. The T4 construction ensures TFPs with a minimum Lee distance equal to 3. The Lee distance gives an indication of the proximity of elements of a TFP, as was explained above, and this choice of Costas sequence separates every pair of OFDM units as much as possible in time and frequency, and thus gives a very high diversity gain.

Figure 4:
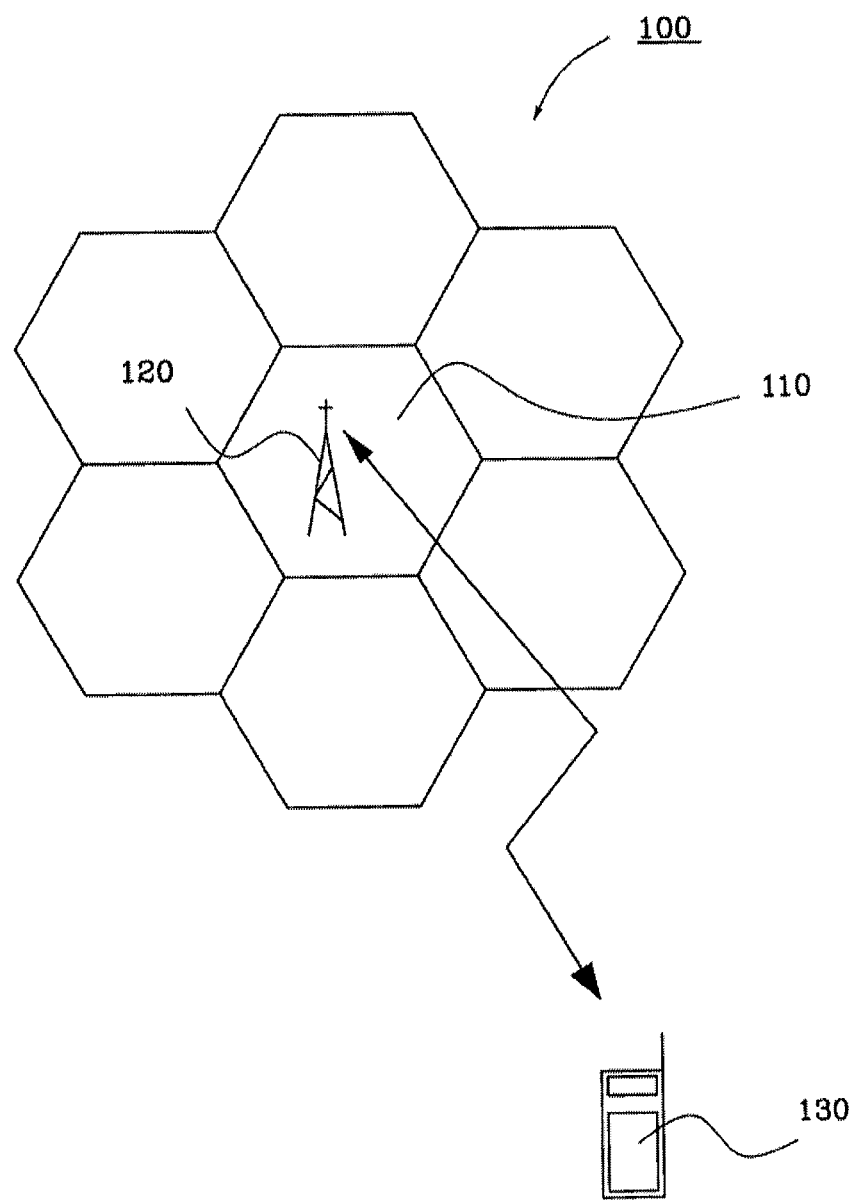
FIG. 4 shows an exemplary system.

Now with reference to FIG. 4, an embodiment of the present disclosure also encompasses a communication system, generally denoted 100, implementing the inventive method. The communication system 100 is preferably divided into several cells 110. In each cell, a base station 120 serves an user equipments 130. The base station 120 and user equipment 130, respectively, includes transmitter(s) including means for implementing the method in accordance with the present disclosure. A person skilled in the art realises that the user traffic multiplexing may be performed elsewhere in the system, such as for example in a mobile switching centre (MSC), a base station controller (BSC), or the like, depending on the communication system in question. The base station and user equipment 130, respectively, may for example include a transceiver and processor (not shown) appropriately programmed for wireless communication in accordance with the invented method for multiplexing. It is further understood that the demultiplexing is performed correspondingly.

In summary, an embodiment of the present disclosure provides a method yielding all of the following advantages:
 1. Intra-cell interference is avoided.
 2. Inter-cell interference is reduced.
 3. Most of the available diversity in the TTI is captured.
 4. The above advantages 1-3 are accomplished without network resource planning.

The disclosure has been described in conjunction with embodiments. It is evident that numerous alternatives, modifications, variations and uses will be obvious to a person skilled in the art in light of the foregoing description. For example, the communication system need not be an OFDM system, so the disclosure could also be used in other frequency-hopping systems, such as for example GSM systems.

The invention claimed is:

1. A method of generating and allocating a time-frequency mapping pattern (TFP), in a communication system, comprising:
   generating, by a base station (BS), a first TFP;
   generating, by the BS, a set of orthogonal TFPs from the first TFP by performing both of:
      cyclically shifting the first TFP in frequency domain, and
      cyclically shifting the first TFP in time domain; and
   allocating, by the BS, at least one TFP selected from the set of orthogonal TFPs to a user equipment (UE) in a transmission time interval (TTI) within a cell of the communication system.

2. The method of claim 1, wherein the first TFP is a sequence of indices of sub-bands used for transmission within a TTI.

3. The method of claim 1, wherein the at least one TFP allocated to the UE is used to map a number of Orthogonal Frequency Division Multiplexing (OFDM) units onto a time frequency grid within the TTI.

4. The method of claim 1, wherein the at least one TFP allocated to the UE is randomly selected from the set of orthogonal TFPs.

5. The method of claim 1, wherein the at least one TFP allocated to the UE is selected from the set of orthogonal TFPs in a fixed way.

6. The method of claim 1, wherein the TTI comprises a number of Orthogonal Frequency Division Multiplexing (OFDM) symbol intervals.

7. The method of claim 1, wherein the first TFP is a Costas sequence.

8. The method of claim 7, wherein the Costas sequence is obtained by a T4 construction.

9. The method of claim 1, wherein the first TFP is a periodic extension of a Costas sequence.

10. The method of claim 1, wherein the first TFP is a shortened Costas sequence.

11. The method of claim 1, wherein the set of orthogonal TFPs is used in the cell of the communication system for user traffic multiplexing.

12. The method of claim 11, wherein the user traffic multiplexing comprises allocation of a sequence of sub-bands for transmission of a traffic channel during a TTI in the cell.

13. The method of claim 11, wherein different cells within the communication system use different cyclically shifted versions of the set of orthogonal TFPs.

14. The method of claim 1, further comprising:
   performing cyclical shift for all TFPs in the set of orthogonal TFPs by a cell specific offset.

15. The method of claim 14, wherein the cell specific offset is changed for each TTI in accordance with a cell specific pseudo-random sequence.

16. The method of claim 14, wherein the cell specific offset corresponds to one of the following: a randomly assigned time slot index, and a randomly assigned frequency sub-band index.

17. The method of claim 1, wherein no TFP from the set of orthogonal TFPs is assigned to more than one UE in the TTI within the cell.

18. A transmitter for use in a communication system, comprising a device configured to:
   generate a first TFP;
   generate a set of orthogonal TFPs from the first TFP by performing both of:
      cyclically shifting the first TFP in frequency domain, and
      cyclically shifting the first TFP in time domain; and
   allocate at least one TFP selected from the set of orthogonal TFPs to a user equipment in a transmission time interval (TTI) within a cell of the communication system.

19. The transmitter of claim 18, wherein the device is further configured to:
   perform cyclical shift for all TFPs in the set of orthogonal TFPs by a cell specific offset.

20. The transmitter of claim 19, wherein the cell specific offset is changed for each TTI in accordance with a cell specific pseudo-random sequence.

21. A base station for use in a communication system, comprising a transceiver and a processor, wherein the processor is configured to:
- generate a first TFP;
- generate a set of orthogonal TFPs from the first TFP by performing both of:
  - cyclically shifting the first TFP in frequency domain, and
  - cyclically shifting the first TFP in time domain; and
- allocate at least one TFP selected from the set of orthogonal TFPs to a user equipment in a transmission time interval (TTI) within a cell of the communication system.

22. The base station of claim 21, wherein the processor is further configured to:
- perform cyclical shift for all TFPs in the set of orthogonal TFPs by a cell specific offset.

23. The base station of claim 22, wherein the cell specific offset is changed for each TTI in accordance with a cell specific pseudo-random sequence.

24. A communication system, comprising a base station (BS) in communication with a user equipment (UE) via a cell of the communication system, wherein the BS is configured to:
- generate a first TFP;
- generate a set of orthogonal TFPs from the first TFP by performing both of:
  - cyclically shifting the first TFP in frequency domain, and
  - cyclically shifting the first TFP in time domain; and
- allocate at least one TFP selected from the set of orthogonal TFPs to the UE in a transmission time interval (TTI).

* * * * *